United States Patent [19]

Yoshida et al.

[11] Patent Number: 5,023,645
[45] Date of Patent: Jun. 11, 1991

[54] LENS POSITION DETECTING DEVICE FOR CAMERA

[75] Inventors: Yutaka Yoshida, Tokyo; Takao Umetsu; Junichi Iwamoto, both of Saitama, all of Japan

[73] Assignee: Fuji Photo Film Co., Ltd., Kanagawa, Japan

[21] Appl. No.: 488,839

[22] Filed: Mar. 6, 1990

[30] Foreign Application Priority Data

Mar. 7, 1989 [JP] Japan ..................................... 1-54183

[51] Int. Cl.[5] .......................... G03B 3/02; G03B 3/10
[52] U.S. Cl. ................................... 354/400; 354/195.1
[58] Field of Search .............................. 354/400–409, 354/195.1–201

[56] References Cited

U.S. PATENT DOCUMENTS 4,411,507 10/1983 Kondo ................................. 354/195
4,914,464 4/1990 Azuma et al. ..................... 354/400

Primary Examiner—L. T. Hix
Assistant Examiner—Jae N. Noh
Attorney, Agent, or Firm—Young & Thompson

[57] ABSTRACT

A lens position detecting device comprises at least two columns of contacts each having a plurality of contacts, the columns being disposed side by side, and a brush having a plurality of brush segments each for contacting the contacts of the corresponding one of the columns and detecting a voltage at a contact thereof. Each contact of one column is shifted by a predetermined amount from the contacts of an adjacent column. The voltage at one contact is different from that at another contact of the same column, and these different voltages detectable at the contacts of one column constitute the same group as for the other columns. The lens position is determined depending on the combination of at least two voltages detected through the brush segments. The lens positions are thus divisible into a greater number of increments at the same time that the device is composed of a smaller number of elements.

13 Claims, 4 Drawing Sheets

LENS POSITION DETECTING DEVICE FOR CAMERA

FIELD OF THE INVENTION

The present invention relates to a lens position detecting device for detecting the position of a lens which moves during zooming or focusing.

A zoom lens system is widely used as the taking lens system in a camera, especially in a compact camera, in addition to an automatic exposure system, an automatic focusing system, an automatic film advancing system, an automatic flash system and so forth. Such a zoom lens system can continuously change the focal length.

Rotational movement of a built-in motor of the camera is used for zooming the taking lens system. A variable focus lens system is preferable, to obtain a high magnification in a compact camera body, wherein the zooming is performed by moving an element of the zooming lens, while focusing is performed by moving an element of the focusing lens. At that time, it is necessary, for proper focusing, to detect the magnification, and hence the lens position, of the zoom lens element.

In a conventional camera, a digital encoder is provided for the lens position detection of the zoom lens group. The encoder comprises a position detecting device for generating an analog signal corresponding to the lens position and a code converter in which the analog signal is subjected to analog-digital conversion and code conversion.

As shown in FIG. 4, a conventional lens position detecting device comprises a predetermined number of resistors $R1, R2, \ldots, Rn$ connected in series and a predetermined number of contacts $a_1, a_2, \ldots, a_n$ (n being a positive integer) which are connected to the resistors such that each contact is connected at a node between adjacent resistors so that a series of different voltages are obtainable from the contacts. The contacts are aligned in the direction of lens movement. When the lens moves, a brush moves with the lens and comes into contact with successive contacts, thereby generating the different voltages. The instantaneous lens position can be detected depending on the instantaneous voltage generated.

PROBLEMS TO BE SOLVED BY THE INVENTION

When using such a variable focus lens, not only should the focusing be performed according to the magnification in the above-described manner, but also the exposure should be corrected according to the magnification. In order to perform the focusing and the exposure control with high accuracy, it is desirable to provide as many increments of lens position detection as possible.

Providing a large number of lens position increments, however, results in a large number of elements in a conventional lens position detecting device as shown in FIG. 4, because it requires the same large number of contacts $a_n$ and therefore as many resistors $Rn$ as the required number of lens position increments. Such an increase in the number of elements will of course increase the cost of the lens position detecting device.

OBJECTS OF THE INVENTION

The principal object of the present invention is accordingly to provide a lens position detecting device which can be comprised of a small number of elements such as resistors and contacts.

Another object of the invention is to provide a lens position detecting device wherein the difference between two analog voltages obtainable from adjacent contacts is so large as not to require high accuracy in analog-digital conversion, thereby to reduce the error in reading.

SUMMARY OF THE INVENTION

To achieve the above and other objects, the present invention provides a plurality of parallel columns each formed of a plurality of contacts. These columns are longitudinally offset or staggered relative to each other such that each contact of the columns is shifted lengthwise of its associated column by a predetermined amount from the contacts of an adjacent column. The contacts are electrically connected such that the voltage obtainable at one contact of a column is different from that at another contact of the same column, and such that a series of different voltages are obtainable from each column. A brush moving with the lens is provided with a plurality of brush segments. The contacts of each column contact the corresponding one of these brush segments.

According to the present invention, the lens position is determined depending on the combination of a predetermined number of voltages detected by the brush segments. Therefore, a larger number of detectable lens position divisions can be provided by setting a smaller number of different voltages for each column of contacts, namely by using a smaller number of resistors. Even if the same voltage is obtained from more than one contact, the lens position can be determined depending on the columns to which these contacts belong or the pattern of the voltage combination. Owing to this arrangement, it becomes also possible to reduce the number of contacts. Reducing the number of resistors and contacts simplifies the circuit construction, which contributes to making the production of the lens position detecting device easier, reducing defects, and lowering the cost of production thereof. Furthermore, since the number of resistors can be decreased, the increment of increase in the analog voltage detectable at the contacts of each column can be made grater, so that high accuracy is not required in analog-digital conversion of the analog voltages and the frequency of error in reading will be reduced to a minimum.

BRIEF DESCRIPTION OF THE DRAWINGS

Other objects and advantages of the present invention will become apparent from the following detailed description when read in conjunction with the accompanying drawings, wherein.

DETAILED DESCRIPTION OF THE PREFERRED EMBODIMENTS

Figure 1:
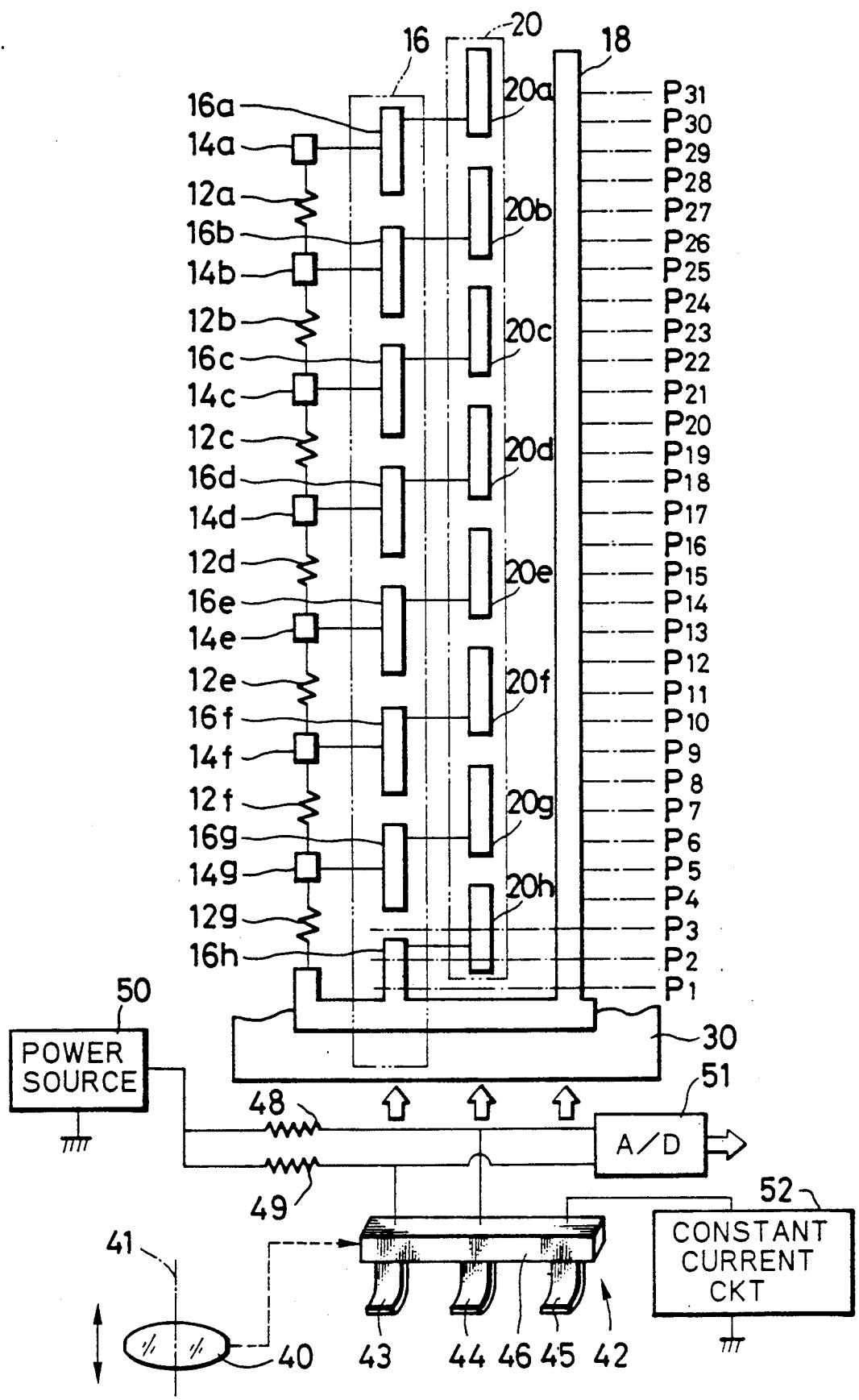
FIG. 1 is a diagrammatic view showing a first embodiment of the lens position detecting device according to the present invention.

Referring to FIG. 1 showing schematically a lens position detecting device according to the first embodiment of the present invention, seven resistors 12a-12g are connected in series. These resistors 12a-12g have the same ohmic value, but alternatively they may have different values. To the resistors 12a-12g are connected to parallel columns of contacts. Contacts 16b-16g of the first column 16 are directly connected at nodes 14b-14g between these resistors 12a-12g, respectively, with a contact 16a being connected at a node 14a to the resistor 12a. The first column 16 further includes a contact 16h connected to a common contact 18. Therefore, the voltages detectable at the contacts 16a-16h are different from each other. The contacts 16a-16h are aligned parallel to the optical axis 41 of a lens 40 which moves according to the focal length to be set.

The second column 20 includes eight contacts 20a-20h which are connected to the contacts 16a-16h of the first column 16, respectively. Accordingly, a series of different voltages Va-Vh are obtainable at the contacts 20a-20h of the second column 20 than at the contacts 16a-16h of the first column, respectively. Furthermore, the second column 20 is longitudinally offset or staggered relative to the first column 16 such that each contact of the second column 20 is shifted lengthwise of its associated column by a predetermined amount from the contacts of the first column 16. In this embodiment, each of the contacts 16a-16g, 20b-20h overlaps at opposite ends two contacts of an adjacent column, whereas the contacts 20a and 16h overlap respectively only the contacts 16a and 20h. The length of every overlapping zone is L/3 provided that the length of each contact is L (except the contact 16h). The contacts of each column are spaced a distance L/3 apart from the adjacent contacts of the same column.

The common contact 18 extends along substantially the entire length of the first and second columns 16 and 20. Designated by 30 is an insulating plate shown with portions broken away for clarity, on which the columns 16 and 20, the common contact 18 and the nodes 14a-14g are formed. The insulating plate 30 is mounted in a camera body.

A brush 42 having brush segments 43-45 supported on a holder portion 46 is mounted on a lens barrel (not shown) for holding the lens 40. The brush 42 moves along with the axial movement of the lens 40 and passes several positions P1-P31 shown in FIG. 1, whereby the brush segment 43 of the brush 42 is seriatim brought into contact with the contacts of the first column 16, and the brush segment 44 is seriatim brought into contact with the contacts of the second column 20. The brush segment 45 is always in contact with the common contact 18.

The brush segments 43 and 44 are each independently connected to a power source 50, e.g. a battery, by resistors 48 and 49 having the same resistance. The nodes between the brush segments and the resistors 43 and 49; 44 and 48 are connected to an A/D converter 51, whereas the brush segment 45 is connected to the ground through a constant current circuit 52.

Next will be described the operation of this first embodiment of the present invention.

When the lens 40 is moved for zooming or focusing, the brush 42 mounted on the lens barrel is moved in the direction of the arrows with its brush segments 43, 44 contacting the contacts of the first and second columns 16, 20, and with its brush segment 45 contacting the common contact 18. As the brush 42 moves within the range P1-P31 shown in FIG. 1, the brush segments 43 and 44 successively contact the contacts of the first and second columns 16 and 20. Upon each brush segment contacting a contact, one of the different voltages Va-Vh is generated at the contact which is detected at the node between the corresponding one of the first and second brush segments 43, 44 and the resistor 49, 48. As described above, different voltages Va-Vh are generated at the respective contacts 16a-16h of the first column and are also generated at the contacts 20a-20h of the second column, respectively. The pattern of generated voltages, which varies in accordance with the movement of the brush 42, is shown in the following Table, wherein the voltages at the contacts 16a-16h are indicated in the column of "Voltage E16" and the voltages at the contacts 20a-20h are indicated in the column of "Voltage E20".

TABLE

| Lens Position | Voltage E16 | Voltage E20 |
| --- | --- | --- |
| P1 | Vh | Vo |
| P2 | Vh | Vh |
| P3 | Vo | Vh |
| P4 | Vg | Vh |
| P5 | Vg | Vo |
| P6 | Vg | Vg |
| P7 | Vo | Vg |
| P8 | Vf | Vg |
| P9 | Vf | Vo |
| P10 | Vf | Vf |
| P11 | Vo | Vf |
| P12 | Ve | Vf |
| P13 | Ve | Vo |
| P14 | Ve | Ve |
| P15 | Vo | Ve |
| P16 | Vd | Ve |
| P17 | Vd | Vo |
| P18 | Vd | Vd |
| P19 | Vo | Vd |
| P20 | Vc | Vd |
| P21 | Vc | Vo |
| P22 | Vc | Vc |
| P23 | Vo | Vc |
| P24 | Vb | Vc |
| P25 | Vb | Vo |
| P26 | Vb | Vb |
| P27 | Vo | Vb |
| P28 | Va | Vb |
| P29 | Va | Vo |
| P30 | Va | Va |
| P31 | Vo | Va |

As is obvious from this Table, all combinations of voltages E16 and E20 obtainable at the contacts of the first and second columns 16, 20 in the positions P1-P31 are different from each other, thereby to indicate at which position each different combination of voltages E16, E20 is obtained. Each pair of obtained voltages E16 and E20 is converted into a combination of digital signals in the A/D converter 51, and then converted into a digital code indicating the lens position, for example in a CPU53. According to the above construction, only seven resistors 12 and sixteen contacts provide 31 increments of distinguishable lens positions.

Figure 2:
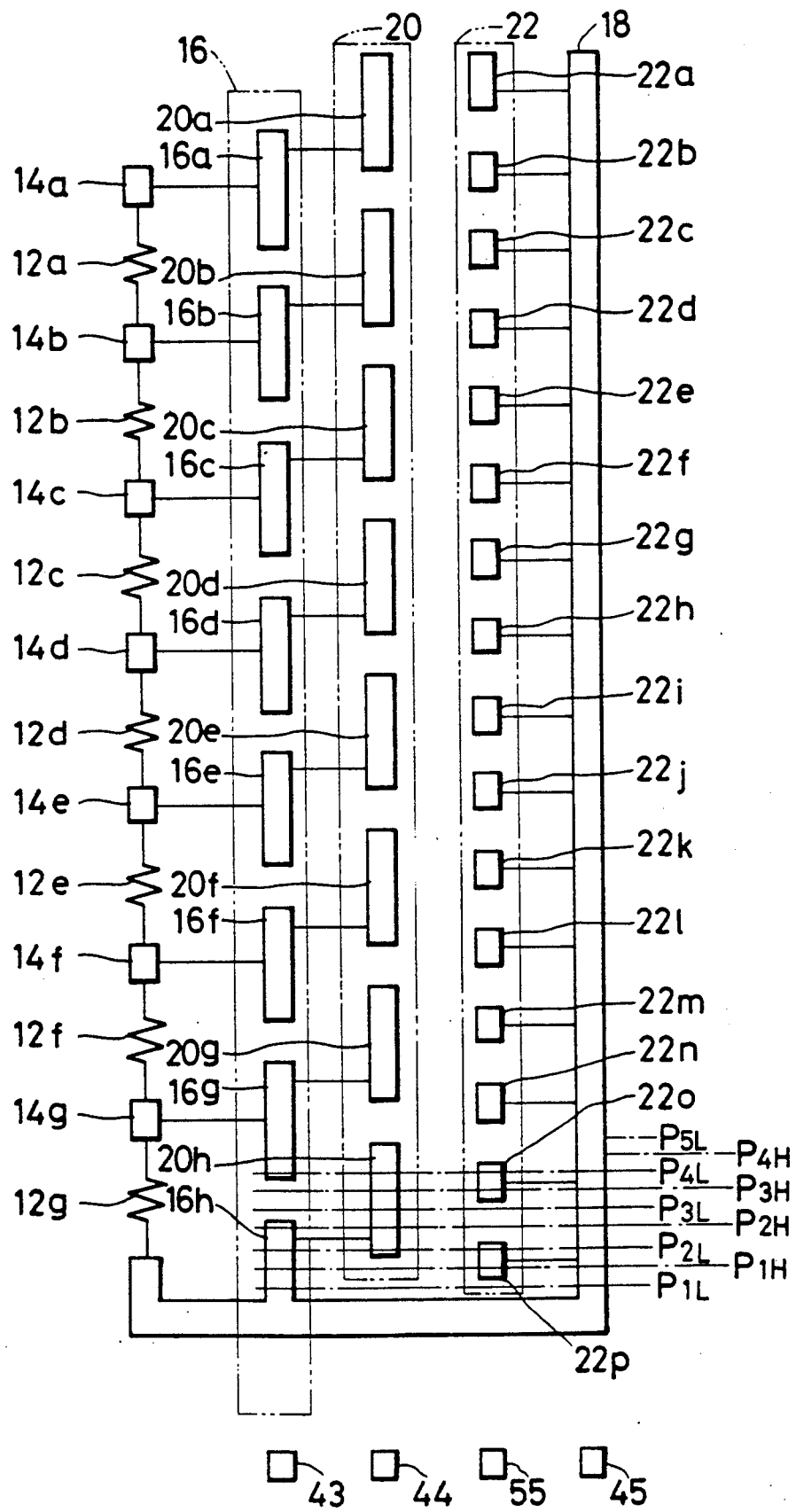
FIG. 2 is an explanatory view showing an arrangement of contacts according to a second embodiment of the present invention.

FIG. 2 shows an arrangement of contacts according to a second embodiment of the present invention. This embodiment comprises a third column of contacts 22 disposed parallel to the two columns 16 and 20 and arranged between the second column 20 and the common contact 18. The third column 22 is formed of sixteen contacts 22a–22p each having a length of L/3 and being spaced apart a length of L/3. As shown in FIG. 2, the contacts 22a–22p are arranged such that half of every other contact of the third column 22 overlaps a contact of the first column 16, whereas half of each of the remaining contacts of the third column 22 overlaps a contact of the second column 20. In this embodiment, the brush 42 further has a fourth brush segment 55 which contacts seriatim the contacts 22a–22p of the third column 22 as the brush moves along the columns 16, 20 and 22.

According to this second embodiment, a predetermined high voltage "H" is generated when the brush segment 55 is in contact with any one of the contacts 22a–22p, whereas a predetermined low voltage "L" is generated when the brush segment 55 is not in contact with the contacts 22a–22p. For example, the lens position P1 shown in FIG. 1 is detected by a combination of two voltages E16=Vh and E20=Vo, namely (Vh, Vo) in accordance with the above-described Table. In this second embodiment, the lens position P1 can be further divided into two divisions P1L and P1H depending on whether the third voltage detected by the fourth segment 55 is H or L. Namely, a voltage combination (Vh, Vo, L) indicates the position P1L and (Vh, Vo, H) indicates the position P1H. In the same way, the other lens positions P2–P31 of the first embodiment are divided into two divisions P2L, P2H; P3L, P3H; . . . P31L, P31H, respectively. Therefore, a total of 62 increments of lens position are distinguishable in this second embodiment.

Figure 3:
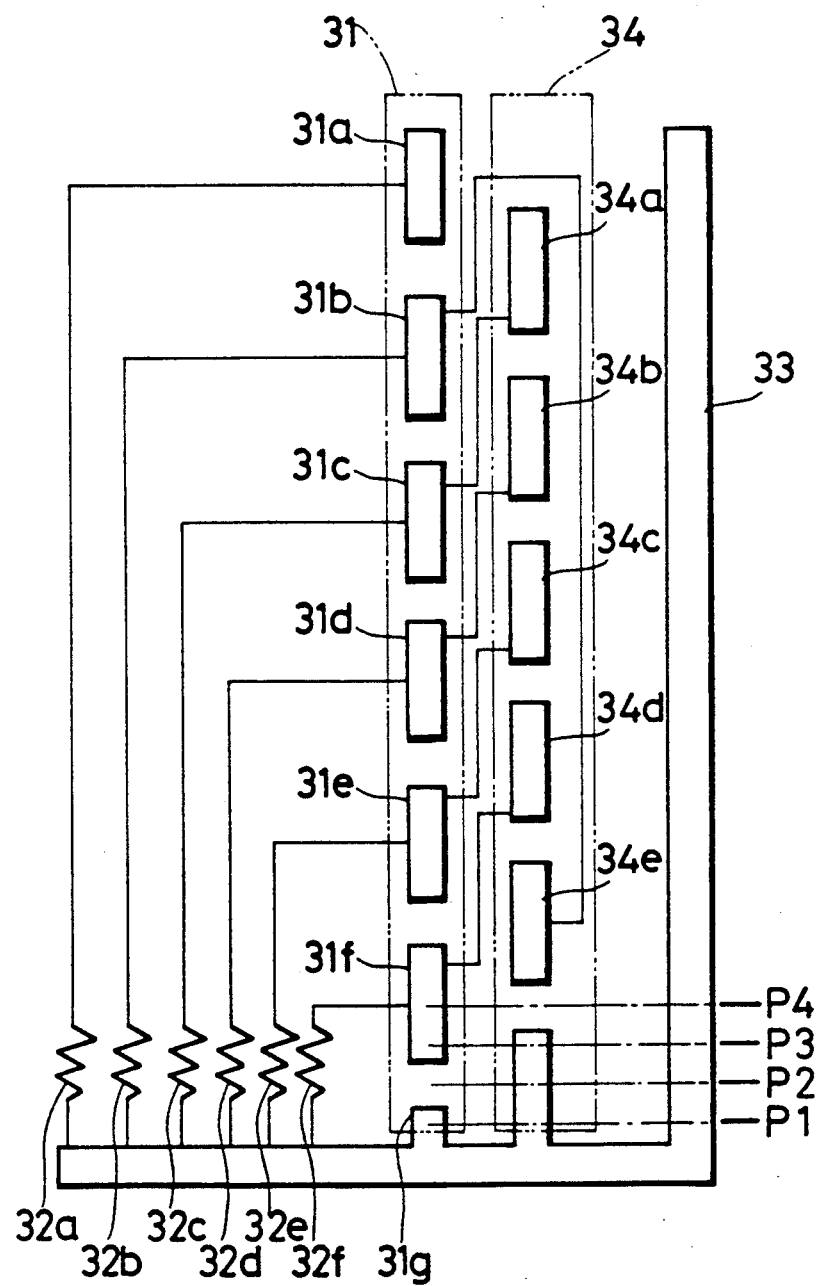
FIG. 3 is an explanatory view showing an arrangement of contacts according to a third embodiment of the present invention.
Figure 4:
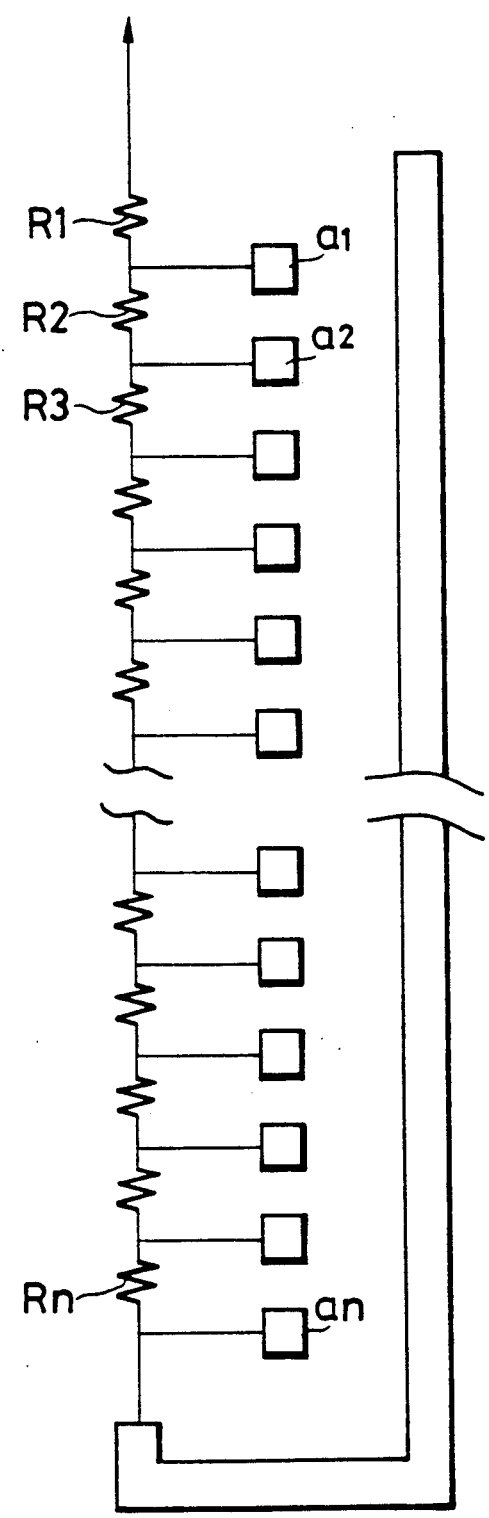
FIG. 4 shows an arrangement of contacts according to a conventional lens position detecting device.

The lens position detecting devices according to the first and second embodiments need a constant-current source 10, since the current will flow through the common resistors when the brush segments 43 and 44 are in contact with the respective contacts 16a–16h and 20a–20h. For the purpose of omitting such a constant-current source, a third embodiment as shown in FIG. 3 is proposed.

According to this third embodiment, contacts 31a–31f of the first column 31 are each separately connected to a common contact 33 by a corresponding resistors 32a–32f. Since the ohmic values of resistors 32a–32f differ from each other, the voltages at the contacts 31a–31f are also different from each other. The first column 31 further includes a contact 31g connected to the common contact 33. The contacts 31b–31f of the first column 31 are each individually connected to a contact of the second column 34 such that the contact 31b is connected, to contact 34e, whereas the contacts 31c, 31d, 31e and 31f are connected to contacts 34a, 34b, 34c and 34d, respectively.

According to this third embodiment, the brush 42 is not immediately brought into contact with two contacts both connected to a common resistor, so that the current will not flow through a common resistor if the brush 42 is in contact with both contacts of the first and second columns 31 and 34. In other words, because the resistors 32a–32f are connected in parallel, the voltages at the contacts of the first and second columns are static, and therefore the lens position can be surely determined without using a constant-current source. Of course, it is possible to divide the lens position into further small increments in the same manner as in the second embodiment.

Although each contact of the first column is connected to a contact of the second column in one-to-one relationship in all the above embodiments, it is possible to connect each contact of the first column to a plurality of contacts of the second column. For example, it is possible to divide each contact 20a–20h of the second column 20 into eight sections and connect the first to eighth sections of each contact 20a–20h separately to the first to eighth contacts 16a–16h of the first column 16, respectively. In this way, as the possible combinations of two voltages (E16, E20), each of eight values Va–Vh can be combined with a series of eight values Va–Vh. Therefore, the detectable lens position is graduated in still more increments.

Although the power source 50 is connected to the brush in the above embodiments, the power source 50 may be connected at the node 14a so as to use the series of resistors as a voltage divider. The brush may be rotated about an axis upon lens movement and, in that case, the contacts should, of course, be arranged in concentric circles around the rotational axis of the brush.

It will be understood that various changes and modifications may be made without departing from the scope of the present invention, which, generally stated, consists in the matter set forth in the accompanying claims.

What is claimed is:

1. A lens position detecting device for a camera which detects the position of a lens moving in the direction of its optical axis, comprising:
   two adjacent parallel columns each comprised by a plurality of contacts disposed on an insulating plate, one of the two columns being longitudinally offset form the other of the two columns such that both ends of each contact of one of said two columns are shifted by a predetermined amount from the ends of the contacts of the other column;
   a brush having a pair of brush segments, each brush segment contacting seriatim the contacts of a corresponding one of said two columns as said brush slides along said columns upon lens movement; and
   means for supplying a group of different voltages to each column such that a voltage detectable at one contact of a column is different from that detectable at another contact of the same column, wherein said voltage supply means comprises a plurality of resistors connected in series, and connected to each of said two columns such that each contact of said two columns is connected to said series of resistors at a node between adjacent resistors.

2. A lens position detecting device as defined in claim 1, wherein all of said resistors have the same resistance.

3. A lens position detecting device as defined in claim 1, wherein one terminal of said series of resistors is connected to the first contact of each of said two columns and to said common contact, and said brush segments contacting said two columns are connected to a power source.

4. A lens position detecting device as defined in claim 3, further comprising a single common contact extending parallel to said two columns, said common contact being in contact with a further brush segment of said brush, said further brush segment being connected to a ground through a constant-current circuit.

5. A lens position detecting device for a camera which detects the position of a lens moving in the direction of its optical axis, comprising:
   two adjacent parallel columns each comprised by a plurality of contacts disposed on an insulating plate, one of the two columns being longitudinally offset from the other of the two columns such that both ends of each contact of one of said two columns are shifted by a predetermined amount from the ends of the contacts of the other column;

a brush having a pair of brush segments, each brush segment contacting seriatim the contacts of a corresponding one of said two columns as said brush slides along said columns upon lens movement; and means for supplying a group of different voltages to each column such that a voltage detectable at one contact of a column is different from that detectable at another contact of the same column, wherein one column is shifted by a distance 2L/3 from the other column, the contacts of each column being spaced a distance L/3 from adjacent contacts of the same column, wherein L is the length of each contact of said two columns.

6. A lens position detecting device as defined in claim 5, further comprising a third column of contacts disposed parallel to the first two columns, the contacts of the third column each having a length L/3 and being spaced apart a distance L/3 and being connected to said common contacts; and a fourth brush segment contacting the contacts of the third column.

7. A lens position detecting device for a camera which detects the position of a lens moving in the direction of its optical axis, comprising:

two adjacent parallel columns each comprised by a plurality of contacts disposed on an insulating plate, one of the two columns being longitudinally offset from the other of the two columns such that both ends of each contact of one of said two columns are shifted by a predetermined amount from the ends of the contacts of the other column;

a brush having a pair of brush segments, each brush segment contacting seriatim the contacts of a corresponding one of said two columns as said brush slides along said columns upon lens movement; and means for supplying a group of different voltages to each column such that a voltage detectable at one contact of a column is different from that detectable at another contact of the same column, further comprising a single common contact extending parallel to said two columns, said common contact being in contact with a further brush segment of said brush, wherein said voltage supply means comprises a plurality of resistors, said resistors having different resistances and being connected to a contact of each of said columns on the one hand and to said common contact on the other hand.

8. A lens position detecting device as defined in claim 7, wherein the first two brush segments are connected to a power source, and the third brush segment contacting said common contact is connected to a ground.

9. A lens position detecting device as defined in claim 8, wherein one column is shifted by a distance 2L/3 from the other column, the contacts of each column being spaced apart a distance L/3 from adjacent contacts of the same column, wherein L is the length of each contact of said two columns.

10. A lens position detecting device for a camera which detects the position of a lens moving in the direction of its optical axis, comprising:

means for generating a number N of voltage combinations, said voltage combinations each consisting of a number M of voltage signals and being different from each other;

selecting means for selecting one of said N voltage combinations in accordance with said lens position;

A/D converting means for converting M voltages of the selected one of said voltage combinations into a combination of M digital signals; and means for transforming said combination of M digital signals into a digital code.

11. A lens position detecting device as defined in claim 10, wherein said voltage combination generating means includes two adjacent parallel columns each comprised by a plurality of contacts disposed on an insulating plate, one of the two columns being longitudinally offset from the other of the two columns such that both ends of each contact of one of said two columns are shifted by a predetermined amount from the ends of the contacts of the other columns and means for supplying a group of different voltages to each column such that a voltage detectable at one contact of a column is different from that detectable at another contact of the same column; and said selecting means includes a brush having a pair of brush segments, each brush segment contacting seriatim the contacts of a corresponding one of said two columns.

12. A lens position detecting device as defined in claim 11, wherein said voltage supply means comprises a plurality of resistors connected in series, and connected to each of said two columns such that each contact of said two columns is connected to said series of resistors at a node between adjacent resistors, and all of said resistors have the same resistance.

13. A lens position detecting device as defined in claim 11, further comprising a single common contact extending parallel to said two columns, said common contact being in contact with a further brush segment of said brush, said voltage supply means comprising a plurality of resistors, said resistors having different resistances and being connected to a contact of each of said columns on the one hand and to said common contact on the other hand.

* * * * *